(12) United States Patent
Silberstein et al.

(10) Patent No.: US 8,156,240 B2
(45) Date of Patent: Apr. 10, 2012

(54) MECHANISM FOR SUPPORTING USER CONTENT FEEDS

(75) Inventors: Adam Eli Silberstein, Sunnyvale, CA (US); Brian Frank Cooper, San Jose, CA (US); Raghunath Ramakrishnan, Saratoga, CA (US); Jeffrey Terrace, Princeton, NJ (US)

(73) Assignee: Yahoo! Inc., Sunnyvale, CA (US)

( * ) Notice: Subject to any disclaimer, the term of this patent is extended or adjusted under 35 U.S.C. 154(b) by 189 days.

(21) Appl. No.: 12/714,876

(22) Filed: Mar. 1, 2010

(65) Prior Publication Data

US 2011/0213894 A1 Sep. 1, 2011

(51) Int. Cl.
*G06F 15/16* (2006.01)
(52) U.S. Cl. ......... 709/232; 709/206; 709/217; 709/224
(58) Field of Classification Search ............... 709/206, 709/217, 224, 225, 232
See application file for complete search history.

(56) References Cited

U.S. PATENT DOCUMENTS

| | | | |
|---|---|---|---|
| 7,058,691 B1 | 6/2006 | Shun et al. | |
| 8,024,452 B2* | 9/2011 | Shenfield et al. | 709/224 |
| 2004/0111476 A1* | 6/2004 | Trossen et al. | 709/206 |
| 2007/0100959 A1* | 5/2007 | Eichstaedt et al. | 709/217 |
| 2008/0016144 A1* | 1/2008 | Hyun et al. | 709/203 |
| 2008/0189429 A1 | 8/2008 | DaCosta | |
| 2008/0244082 A1* | 10/2008 | Shen et al. | 709/232 |
| 2009/0063643 A1* | 3/2009 | Setiawan et al. | 709/206 |
| 2010/0011088 A1* | 1/2010 | Gautier et al. | 709/230 |
| 2010/0082741 A1* | 4/2010 | Kawada | 709/203 |
| 2010/0095016 A1 | 4/2010 | Zuckerman et al. | |
| 2010/0106790 A1* | 4/2010 | Shenfield | 709/206 |

FOREIGN PATENT DOCUMENTS

EP 1143352 10/2001

OTHER PUBLICATIONS

Agarland, "RSS to Email: The Pull and Push Mediums of the Web", Sep. 2010, www.blueskyfactory.com.*
Mayfield, Ross, "Push vs. Pull", Jan. 2004, www.corante.com/archives/2004/01/05/push_vs_pull.php.*
PCT/US11/00383: Application as filed on Dec. 28, 2011, 61 pages.
PCT/US11/00383: Initial Publication without international search report on Sep. 9, 2011, 53 pages.
PCT/US11/00383: International Search Report mailed Nov. 25, 2011, 6 pages.
PCT/US11/00383: Written Opinion mailed Nov. 25, 2011, 3 pages.

* cited by examiner

*Primary Examiner* — Ramy M Osman (57) ABSTRACT

In one embodiment, for each one of one or more content producers, access a content-producing rate at which the content producer produces one or more items of content; and for each one of one or more content consumers, access a content-consuming rate at which the content consumer consumes one or more items of content. For each one of a plurality of consumer-producer pairs, wherein the consumer-producer pair comprises one of the content consumers and one of the content producers, and the content consumer follows the content producer, select between a push strategy and a pull strategy for delivering one or more items of content from the content producer to the content consumer based on the content-consuming rate of the content consumer and the content-producing rate of the content producer.

24 Claims, 4 Drawing Sheets

MECHANISM FOR SUPPORTING USER CONTENT FEEDS

TECHNICAL FIELD

The present disclosure generally relates to constructing multiple content feeds between multiple content producers and multiple content consumers and more specifically relates to analyzing each of the content feeds to select between a push strategy and a pull strategy for the content feed.

BACKGROUND

Internet users like to be kept up-to-date with what is going on. To this end, social networking sites such as Twitter and Facebook provide, to a user, a feed of status updates, posted photos, movie reviews, and so on generated by the user's friends. Content aggregators such as My Yahoo and iGoogle provide a customized web page aggregating feeds from multiple RSS sources. Similarly, news aggregators such as Digg and Reddit provide a feed of the latest stories on topics like "entertainment" and "technology", while news sites such as CNN.com provide the ability to follow fine-grained topics like "health care debate".

Near real-time content feeds are becoming a key feature of many popular web applications. Examples include user generated events on Twitter and Facebook, and news stories on particular topics on iGoogle and My Yahoo. Consequently, it is increasingly important for these web applications to be able to efficiently construct a web page showing the latest contents from a user's feed. Constructing such a feed must be fast so the web page loads quickly. However, the wide fan-out of contents (e.g., some sources have many followers) and high skew (e.g., fan-out and rates vary widely) make it difficult to scale such applications.

SUMMARY

The present disclosure generally relates to constructing multiple content feeds between multiple content producers and multiple content consumers and more specifically relates analyzing each of the content feeds to select between a push strategy and a pull strategy for the content feed.

In particular embodiments, for each one of one or more content producers, access a content-producing rate at which the content producer produces one or more items of content; and for each one of one or more content consumers, access a content-consuming rate at which the content consumer consumes one or more items of content. For each one of a plurality of consumer-producer pairs, wherein the consumer-producer pair comprises one of the content consumers and one of the content producers, and the content consumer follows the content producer, select between a push strategy and a pull strategy for delivering one or more items of content from the content producer to the content consumer based on the content-consuming rate of the content consumer and the content-producing rate of the content producer. With the push strategy, each one of the items of content is delivered from the content producer to the content consumer when the item of content is produced by the content producer. With the pull strategy, each one of the items of content is delivered from the content producer to the content consumer when the item of content is consumed by the content consumer.

These and other features, aspects, and advantages of the disclosure are described in more detail below in the detailed description and in conjunction with the following figures.

DETAILED DESCRIPTION

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A content feed, also referred to as a web feed, or simply a "feed", is a mechanism for delivering contents, especially frequently updated contents, between network users. A content feed may take various formats. For example, RSS (most commonly expanded as "Really Simple Syndication") is a family of web feed formats widely used to deliver contents. Similarly, contents delivered via a content feed may be in various formats, such as, for example and without limitation, blog entries, news headlines, events, audio, and video. The present disclosure contemplates any applicable content feed and content. A content feed conceptually connects a content producer and a content consumer at each end. In particular embodiments, a content producer, or simply a producer, is an entity that produces contents that may be consumed by one or more content consumers. On the other hand, a content consumer, or simply a consumer, is an entity that consumes contents produced by one or more content producers. In this sense, one may say that a consumer "follows" or a follower of the contents produced by one or more producers. Contents may be delivered from a producer to a consumer via a feed connecting the producer and the consumer. Note that an entity may be both a producer and a consumer, as the entity may produce contents for others to consume at one time and consume contents produced by others at another time. Thus, with respect to a feed where an entity produces contents for another, the entity is referred to as the producer; and with respect to another feed where the same entity consumes contents from another, the entity is referred to as the consumer. Sometimes, two entities, entity A and entity B, may be mutual producers and consumers for each other. That is, in some cases, entity A may produce contents for entity B to consume; and in other cases, entity B may produce contents for entity A to consume. Thus, there may be two separate feeds both connecting entity A and entity B. With one feed, entity A is the producer and entity B is the consumer; and with another feed, entity B is the producer and entity A is the consumer. In addition, a producer may or may not be the original creator of the contents it produces. For example, a producer may produce news stories originally written by other news reporters or digital photos originally taken by other photographers or video clips recorded by the producer itself.

In particular embodiments, a follows application enables a user to follow one or more interests, where an interest may be, for example and without limitation, another user or a content category or topic. Here, the user that follows the interests is a consumer. The goal of the follows application is to produce a feed for an interest-following user (i.e., a consumer), which is a combined list of the recent or latest contents across all of the producers the user is following. For example, a feed may combine recent status updates from all of the user's friends on a social site, or recent stories on all of the user's topics on a content aggregation site. In some cases, a user may prefer a combined feed, including both social and topic updates. In particular embodiments, in connection with a follows application, a producer may generate a series of time-ordered, human-readable contents for a particular followable interest. Thus, to a user (i.e., a consumer), a producer may be a friend, a website, or an aggregator of content on a particular topic collected from multiple sources.

Follows applications are notoriously difficult to scale. The application must continually keep up with a high throughput of contents. For example, Twitter engineers have famously described re-architecting Twitter's back-end multiple times to keep up with rapid increases in throughput as the system became more popular. At the same time, interest-following users expect their feed page to load fast, which means latency must be strictly limited. This often leads to extensive materialization and caching, with associated high capital and operations expenditure. For example, Digg elected to de-normalize and materialize a large amount of data to reduce latency for their "green badge application" (e.g., follow which stories my friends have dugg), resulting in a blow up of stored data from tens of gigabytes to three terabytes.

There are several reasons why such follows applications are hard to scale. First, contents fan-out, resulting in a multiplicative effect on the load in the system. For example, whenever Ashton Kutcher "tweets", his status update is propagated to over 3.8 million followers. Even a more moderate average fan-out can cause scaling problems. Second, the fan-outs have high skew, making it difficult to choose an appropriate strategy. Facebook, for example, reportedly employs different feed materialization strategies for wide-fan-out users like bands and politicians compared to the majority of users, which have much narrower fan-out.

To address at least some of the problems faced by, for example, follows applications and improve application performance, particular embodiments selectively materializing each consumer's feed. In particular embodiments, contents from high-rate producers are retrieved at query time (i.e., a pull strategy), while contents from lower-rate producers are materialized in advance (i.e., a push strategy). Furthermore, a formal analysis of the problem suggests that the proper strategy depends on the ratio between a given producer's content-producing rate and a given consumer's content-consuming rate (e.g., page-view rate). Thus, some producers may be materialized for some consumers but not others; and some portions of a consumer's feed may be materialized while other portions are not. Experimental results, using a real web database infrastructure, indicate that this hybrid strategy results in the lowest system load, and hence improves scalability, under a variety of workloads.

As described above, a producer may produce contents that are consumed by one or more consumers; and a consumer may consume contents that are produced by one or more producers. Furthermore, a content is delivered from a producer to a consumer via a feed connecting the producer and the consumer. Theoretically, a given content may be delivered from a producer to a consumer any time in-between the time the content is produced by the producer and the time the content is consumed by the consumer. With respect to a content, the time it is produced by the producer may be referred to as "materialize" time (i.e., the content materializes), and the time it is consumed by the consumer may be referred to as "query" time (i.e., the consumer queries or requests the content for consumption).

In particular embodiments, there are two strategies for managing contents between producers and consumers: push and pull. In particular embodiments, with the push strategy, a content is delivered (i.e., pushed) to each of the consumers that follows the content at the time a producer produces the content; thus, the push strategy may also be referred to as the "materialize" strategy using a traditional database term. In contrast, with the pull strategy, contents followed by a consumer are retrieved (i.e., pulled) from each of the producers producing the contents at the time the consumer requests the contents for consumption; thus, the pull strategy may also be referred to as the "query" strategy again using a traditional database term. Sometimes, push is the better strategy, so that when consumers are ready to consume the contents they follow (e.g., query for the contents using a follows application), their feeds are pre-computed, reducing system load and latency. In contrast, if a consumer consumes contents infrequently compared to the rate at which a producer produces contents, the pull strategy may be better. Since typically, only the most recent N contents need to be displayed, it is wasteful to push and materialize a large amount of contents that will later be superseded by newer contents before the consumer has a chance to consume (e.g., view or download) them.

The approach of particular embodiments is based on the insight that even within the same application, sometimes push is better, and other times pull is better. In fact, in particular embodiments, a particular consumer's feed may be a combination of both push and pull. This is because of skew in the content production rate. For example, a particular consumer that requests contents once per hour may be consuming contents more frequently than one producer's content-producing rate (that is, the consumer's content-consuming rate is higher than one producer's content-producing rate so push is better) and less frequently than another producer's content-producing rate (that is, the consumer's content-consuming rate is lower than another producer's content-producing rate so pull is better). Particular embodiments make push/pull decisions on a per-(p,c) basis, where p denotes a producer and c denotes a consumer. Experiments and experience with a live follows application shows that this approach scales better than a purely push or purely pull system. Of course, the concept of making push/pull decisions on a per-(p,c) basis based on the relative content-producing and content-consuming rates of the producer and the consumer, respectively, may be extended to be applied to any consumer-producer type of applications, in addition to the follows applications.

The follows problem is similar to previously explored problems in database systems. For example, the "materialize or not" question is frequently explored in the context of index and view selection. However, in the context of the follows problem, the question is not which views to create, but how much of a single "feed" view to materialize. Particular embodiments may borrow some of the concepts (e.g. materializing frequently accessed data) from work on partially materialized views and indexes. But unlike previous works, it is not possible to make a single "materialize or not" decision for a given base tuple; instead, a decision needs to be made for each consumer-producer pair based on their relative content-producing and content-consuming rates.

Figure 1:
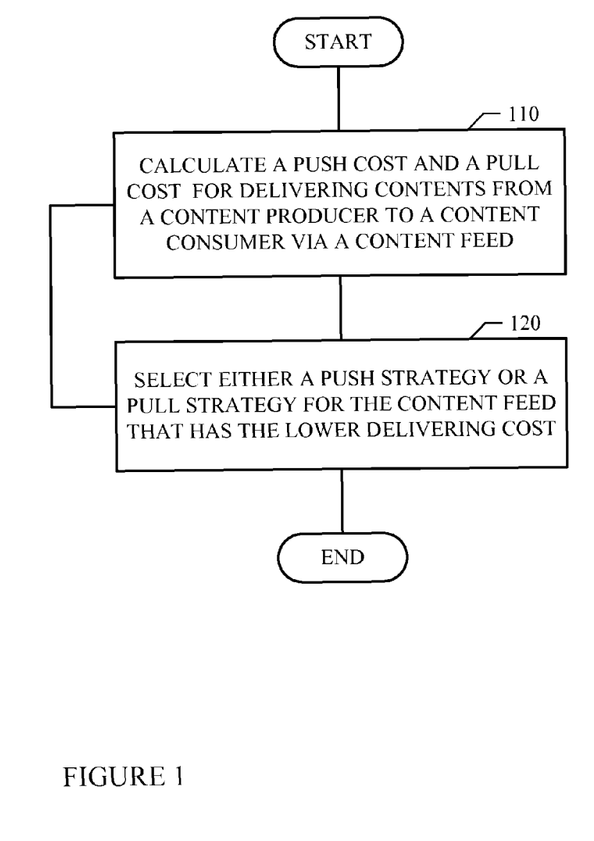
FIG. 1 illustrates an example method for determining strategies for individual content feeds.

FIG. 1 illustrates an example method for determining strategies for individual content feeds. Briefly, particular embodiments calculate a push cost and a pull cost for delivering contents from a producer to a consumer (step 110) and select either the a pull strategy or a pull strategy for the consumer-producer pair that has the lower delivering cost (step 120). The two steps may be repeated for each unique pair of producer and consumer.

The following TABLE 1 shows the notations used in the present disclosure. The individual concepts are described in more detail below.

TABLE 1

NOTATIONS

| Notation | Description |
| --- | --- |
| $P_j$ | producer |
| $c_i$ | consumer |
| $f_{i,j}$ | "follows": consumer $c_i$ follows producer $P_j$ |
| $F_i$ | the set of all producers that consumer $c_i$ follows |
| $ct_{j,k}$ | the k th content produced by producer $P_j$ |
| $\phi_{P_j}$ | producer $P_j$'s content-producing frequency |
| $\phi_{c_i}$ | consumer $c_i$'s content-consuming (i.e., content-query) frequency |
| $\pi_g$ | number of contents to show in a feed in case of global coherency |
| $\pi_P$ | maximum number of contents to show per producer in a feed in case of per-producer coherency |

In particular embodiments, there is a set of consumers (e.g., users of a follows application) who are following the content streams generated by a set of producers. Each consumer may choose the producers they wish to follow. In particular embodiments, if a consumer chooses to follow a particular producer, then the contents produced by that producer are delivered to the consumer at appropriate times. In particular embodiments, a producer may generate a named sequence of human-readable, time-stamped contents. Examples of producers may include "Ashton Kutcher's tweets" or "news stories about global warming". A producer may be a person (e.g., users of a follows application), a website (e.g., a news site or blog), or an aggregator of contents from multiple sources. Particular embodiments treat each followable "topic" (e.g., "global warming" or "health care debate") as a separate producer when discussing the steps of FIG. 1, even if the content for different topics comes from the same website or data source (i.e., the same entity). That is, if a single producer produces multiple content streams, each content stream is analyzed separately. In particular embodiments, contents are ordered by the time they are created, although alternatively embodiments may use other ordering schemes.

Figure 2:
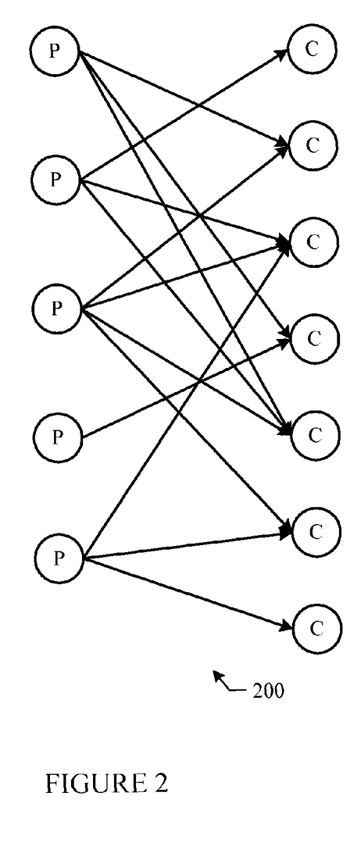
FIG. 2 illustrates an example connection network.

Particular embodiments may define a connection network as a directed graph G(V,F), where V is a set of vertices and F is a set of follows edges. In particular embodiments, each vertex $v_i \in V$ represents either a consumer or a producer, and there is a follows edge $f_{i,j} \in F$ between a producer vertex $p_j$ to a consumer vertex $c_i$ if $c_i$ follows $p_j$ (e.g., $c_i$ consumes the contents produced by $p_j$). FIG. 2 illustrates an example connection network 200 having several producer vertices and several consumer vertices. Of course, a connection network may include any number of producers and consumers, and there may be any number of connections (i.e., follows edges) between individual producers and consumers. Social networks are one example of a type of connection network, but any consumer-producer graph may be a connection network, and the present disclosure contemplates any applicable connection networks. Particular embodiments may consider a connection network as a relation ConnectionNetwork(Producer, Consumer).

In particular embodiments, the connection network may be stored explicitly in a form that supports efficient lookup by producer, consumer, or both. For example, to push a content from producer $p_j$ to one or more interested consumers, particular embodiments may look up $p_j$ in the connection network and retrieve the set of consumers following that content, which is denoted as $\{c_i : f_{i,j} \in F\}$. In contrast, to pull contents for a consumer $c_i$ from one or more producers, particular embodiments may look up $c_i$ in the connection network and retrieve the set of producers followed by that consumer, which is denoted as $\{p_j : f_{i,j} \in F\}$. In this latter case, particular embodiments may actually define the relation as ConnectionNetwork (Consumer, Producer) to support clustering by consumers. To support both access paths, via producer and via consumer, particular embodiments may build an index in addition to the ConnectionNetwork relation.

In particular embodiments, the contents themselves logically form a relation as Content(ContentID, Producer, Timestamp, Payload). For efficiency, particular embodiments may store the contents in one or both of the following ways: (1) producer-pivoted: contents are clustered by producer, in a relation ProducerPivoted(Producer, ContentID, Timestamp, Payload); and (2) consumer-pivoted: contents are duplicated and clustered per consumer, in a relation ConsumerPivoted (Consumer, Producer, ContentID, Timestamp, Payload).

The producer-pivoted model supports the pull strategy. To retrieve a set of contents to show to a consumer, particular embodiments retrieve a corresponding set of producers (e.g., from ConnectionNetwork) that are followed by the consumer, then look up each producer in the ProducerPivoted table to retrieve recent contents (e.g., the join ConnectionNetwork JOIN ProducerPivoted). In contrast, the consumer-pivoted model supports the push strategy. With push, particular embodiments materialize contents into the ConsumerPivoted relation by inserting a tuple for each consumer that is following the content's producer. Retrieving the consumer's feed is then a range scan for all tuples for the consumer. In fact, particular embodiments do not need to store Contents explicitly; instead, particular embodiments may store and query the ProducerPivoted relation and may materialize ConsumerPivoted as a view over the join ConnectionNetwork JOIN ProducerPivoted.

As described above, particular embodiments individually chooses between the push strategy and the pull strategy for each follows edge that indicates which consumer follows contents produced by which producer. In other words, particular embodiments explore a hybrid approach, where some of the contents are materialized into ConsumerPivoted, and other contents are only stored in ProducerPivoted and pulled when necessary. Again, this decision is made for each consumer-producer pair in the connection network.

Whenever contents are delivered or displayed to a consumer (e.g., via a network device used by the consumer), particular embodiments may say that the consumer has retrieved its content feed (or simply feed). The content retrieval may be triggered by a variety of causes, such as the consumer logging onto a website or refreshing a page on the website. In particular embodiments, a consumer's updated feed may be retrieved automatically, using, for example, Ajax, Flash or any other suitable technology. In particular embodiments, the feed itself displays an ordered collection of contents from one or more of the producers followed by the consumer. A feed typically shows only the N most recent contents, although a consumer may request more previous contents (e.g. by clicking "next").

Particular embodiments may define several properties that capture consumers' expectations with respect to their feeds. First, a feed should be time-ordered; that is, contents in a feed are displayed in timestamp order, such that for any two contents $ct_1$ and $ct_2$ in a feed, if Timestamp $(ct_1)$<Timestamp $(ct_2)$, then if the contents are displayed in chronological order, $ct_1$ is displayed before $ct_2$ in the feed, and if the contents are displayed in reverse chronological order, $ct_2$ is displayed before $ct_1$ in the feed. For example, if the contents are displayed in a web page, then the content that is displayed earlier is nearer to the top of the web page then the content that is displayed later. Second, the contents in a feed should be gapless; that is, contents from a particular producer are displayed without gaps, such that, if there are two contents $ct_1$ and $ct_2$ from a producer, p, $ct_1$ precedes $ct_2$ in the feed, and there is no content from p in the feed that succeeds $ct_1$ but precedes $ct_2$, then there is no content produced by p with a timestamp greater than $ct_1$ but less than $ct_2$ (in the case of chronological display order). Third, there should be no duplicates of the contents in a feed; that is, no content $ct_k$ appears more than once in a feed.

When a consumer retrieves its feed twice, it may have some expectations about how the feed changes between the first and second retrieval. For example, if the consumer has seen some contents in a particular order from the first retrieval, the consumer usually expects to see those contents again in the same order from the second retrieval. For example, consider an example feed that contains N=5 contents. A consumer's feed, retrieved at 2:00 pm, may include:

TABLE 2

FIRST EXAMPLE FEED

| Event | Time | Producer | Text |
|---|---|---|---|
| $ct_5$ | 1:59 | Alice | Alice had lunch |
| $ct_4$ | 1:58 | Chad | Chad is tired |
| $ct_3$ | 1:57 | Alice | Alice is hungry |
| $ct_2$ | 1:56 | Bob | Bob is at work |
| $ct_1$ | 1:55 | Alice | Alice is awake |

At 2:02 pm, the consumer may refresh his web page, causing a new version of the feed to be retrieved. Suppose that between 2:00 pm and 2:02 pm, two new contents have been generated from Alice:

TABLE 3

SECOND EXAMPLE FEED
(WITH GLOBAL COHERENCY)

| Event | Time | Producer | Text |
|---|---|---|---|
| $ct_7$ | 2:01 | Alice | Alice is at work |
| $ct_6$ | 2:00 | Alice | Alice is driving |
| $ct_5$ | 1:59 | Alice | Alice had lunch |
| $ct_4$ | 1:58 | Chad | Chad is tired |
| $ct_3$ | 1:57 | Alice | Alice is hungry |

In the second example feed, the two new contents produced by Alice, $ct_6$ and $ct_7$, have resulted in the two oldest contents, $ct_1$ and $ct_2$ disappearing from the feed, while the global ordering of all contents across the consumer's producers is preserved. This property (i.e., preserving the global ordering of all contents) may be called "global coherency": the sequence of contents in the feed matches the underlying timestamp order of all contents from a consumer's producers, and content orders are not shuffled from one view of the feed to the next. This model is familiar to most email readers that show emails in time order, and is used in follows applications like Twitter.

However, in some cases global coherency may not desirable. Consider the example feed in TABLE 3. There are many Alice contents but no Bob contents. Such lack of diversity in terms of contents produced by different producers may result when some producers temporarily or persistently have higher content rates than other producers. Feed diversity is described in more detail below. To preserve diversity, a consumer may prefer "per-producer coherency": the ordering of contents from a given producer is preserved, but no guarantees are made about the relative ordering of contents between different producers. Under per-producer coherency, when the consumer refreshes his feed at 2:02 pm, the consumer may see:

TABLE 4

THIRD EXAMPLE FEED
(WITH PER-PRODUCER COHERENCY)

| Event | Time | Producer | Text |
|---|---|---|---|
| $ct_7$ | 2:01 | Alice | Alice is at work |
| $ct_6$ | 2:00 | Alice | Alice is driving |
| $ct_5$ | 1:59 | Alice | Alice had lunch |
| $ct_4$ | 1:58 | Chad | Chad is tired |
| $ct_2$ | 1:56 | Bob | Bob is at work |

The third example feed preserves diversity, because the additional Alice contents, $ct_6$ and $ct_7$, do not result in the Bob content, $ct_2$, disappearing from the third example feed. However, whereas in the second example feed, there is an Alice content, $ct_3$, between the Bob content, $ct_2$, and the Chad content, $ct_4$, in the third example feed there is not. This content "disappearance" is not possible under global coherency, but is allowed under per-producer coherency to help preserve diversity.

Because of the skew in content-producing or content-consuming rates that is inherent in many consumer-producer applications (e.g., follows applications), particular embodiments may need to take explicit steps to preserve diversity. Consider, for example, a user (a "user" refers to a user of a consumer-producer application and may be either a producer or a consumer or both), David, who logs in to the application once a day. His father (e.g., a second user), Bob, may only generate a content once a day, while his sister (e.g., a third user), Alice, generates a new content once an hour. When David logs in, he would like to see his father Bob's latest content, even though there may be many more recent contents from Alice.

In particular embodiments, a simplistic way to define diversity is to specify that a feed of a consumer must contain at least one or more generally, at least k contents from each of the producers the consumer follows. However, a consumer may follow more producers than there are slots in the feed, making it impossible to show at least k contents from every producer. Moreover, particular embodiments do not necessarily want to show extremely old contents just to satisfy the constraint. For example, if Bob's latest content is a year old, particular embodiments may not want to include it in the feed for David, even if this means showing zero Bob contents, because extremely old contents tend to be obsolete or meaningless to the consumer.

Therefore, particular embodiments define the notion of k,t-diversity. Informally using the above example, in particular embodiments, k,t-diversity specifies that if there is a content from Bob in the last t time units, then no more than k contents from Alice should be shown in a feed unless the Bob content is shown in the feed. More formally, consider two producers $p_i$ and $p_j$ being followed by consumer c. Particular embodiments define Candidate (p, t) as the number of contents from producer p that are no older than t seconds, and Count (p) as the number of contents from producer p that are shown in c's feed. Then, k,t-diversity may be defined as: if Candidate $(p_i, t)>0$, and Count $(p_i)=0$, then Count $(p_j) \leq k$.

Consider again the first, second, and third example feeds. Suppose it has been specified that t=600 sec and k=1. Then, the second example feed (illustrated in TABLE 3) is not permitted, since Candidate (Bob, 600 sec)=1 and Count (Bob)=0, but Count (Alice)>1. The third example feed, however, is permitted. Note that in some cases a stronger notion of diversity may be preferred. For example, if there are actually many Bob contents, it may not be preferable to show ten Alice contents and only one Bob content in a feed. Therefore, particular embodiments may wish to maximize some notion of "entropy" in the contents that they show. For the purposes of the present disclosure, however, k,t-diversity captures a minimal notion of diversity, and illustrates that even a minimal notion of diversity conflicts with the global coherency guarantee.

Generating feeds requires system processing. For example, work is done at query time for pull, or content generation time for push. The type of workload placed on the system by this processing (i.e., the amount of system resources needed) depends on the architecture. For example, if materializing data on disk, then the main cost is likely to be input/output (I/O) cost resulting from reading data from and writing data to memory. On the other hand, in many consumer-producer applications (e.g., follows applications), data is only materialized in Random Access Memory (RAM) for performance. In this case, the main cost is likely to be processor (e.g., CPU) cost.

Particular embodiments formally define Cost ( ) as the total usage of the bottleneck resource (e.g. I/O or CPU) of the system. This usage may include both processing contents at generation time, as well as generating feeds at query time. Then, in particular embodiments, the general optimization problem for consumer-producer applications may be defined as minimizing Cost ( ) while: (1) providing feeds that are time-ordered, gapless and no-duplicates; (2) respecting the chosen level of coherency (e.g., global or per-producer); and (3) if using per-producer coherency, then also ensuring k,t-diversity. In addition, particular embodiments may also take latency into consideration (e.g., as an additional constraint) when optimizing a consumer-producer application, in which case some extra system cost may be traded in order to reduce latency. The latency-constrained optimization problem for consumer-producer applications may be defined as minimizing Cost ( ), while: (1) providing feeds that are time-ordered, gapless and no-duplicates; (2) respecting the chosen level of coherency (e.g., global or per-producer); (3) if using per-producer coherency, then also ensuring k,t-diversity; and (4) ensuring the Nth percentile latency is less than L. One example case may specify that the 99th percentile latency be no more than 50 milliseconds. This constraint may lead to making different decisions about pushing or pulling contents (e.g., pushing more contents so that query time latency meets the constraint).

A producer may be an atomic entity (e.g., an application user or news website) or may be an aggregator of multiple other sites. Aggregators are important to some consumer-producer applications because they can produce a single stream of contents on a given topic from multiple sources. Moreover, aggregators can extract information from sources that would not normally push new contents. Particular embodiments treat atomic and aggregating producers the same, and consider only their content-producing rate and fan-out. However, in particular embodiments, a more general problem may be to examine the decisions that an aggregator must make: should the aggregator use push or pull for a given upstream source? Although this decision may be similar to the decisions particular embodiments make when deciding to push or pull for a consumer-producer pair, there are additional complexities (e.g., how frequently to pull, and how to deal with upstream sources with different push or pull costs).

As described above, particular embodiments may consider two strategies, push and pull, for processing contents. The approach, in particular embodiments, is to choose at a fine granularity between these strategies. For a given consumer, particular embodiments may choose to push for relatively low-frequency (in terms of content producing) producers and pull for relatively high-frequency (in terms of content producing) producers. For a consumer with a different content-consuming or content-query frequency but the same producers, different decisions may be made. Particular embodiments may, for a given (consumer, producer) pair, examine the ratio between the producer's content-producing frequency and the consumer's content-consuming frequency. Depending on whether the value of this ratio satisfies a threshold requirement, particular embodiments may choose either the push or the pull strategy for this particular (consumer, producer) pair. In particular embodiments, the threshold requirement for the ratio may be determined based on experiments. For example, in one implementation, based on experimental results, for a (consumer, producer) pair, if the ratio between the content-producing frequency and the content-consuming frequency is greater than approximately 3, then the push strategy is selected; otherwise, the pull strategy is selected.

Sometimes, a particular consumer or producer may exhibit different but predictable behavioral patterns with respect to its content-consuming or content-producing activities over some period of time (e.g., on a daily or weekly basis). Particular embodiments may take into consideration such behavioral patterns when choosing between the push and pull strategies for each (consumer, producer) pair. More specifically, particular embodiments may decide between push and pull based on time as well as or instead of the content-producing frequency or the content-consuming frequency. For example, suppose a consumer normally consumes contents frequently; thus, the relatively high content-consuming frequency suggests that for this consumer, the push strategy should be used in general. However, the consumer's behavioral patterns may indicate that the consumer does not request (i.e., consume) any content between midnight and 7:00 am each day. Thus, if any content is produced between midnight and 7:00 am, the pull strategy may be used to deliver that content. Moreover, for the first request the consumer makes after 7:00 am, the pull strategy may also be used.

A producer may produce one or more contents at a rate of certain content-producing frequency $\phi_{P_j}$ (e.g., producing $n_j$ contents per day), and a consumer may consume one or more contents (not necessarily produced by the same producer) at a rate of certain content-consuming frequency $\phi_{c_i}$ (e.g., consuming $n_i$ contents per day). Of course, in reality, producers and consumers do not necessarily follow such consistent routines, and the actual number of contents each entity produces or consumes may vary from day to day. Thus, particular embodiments may use an average or mean content-producing or content-consuming frequency representing the statistic over some period of time for each producer and consumer.

In particular embodiment, the "minimizing Cost ( )" problem as defined above may be solved for both the per-producer and global coherency cases, by assigning each (producer, consumer) pair a push or pull decision. In particular embodiments, the query latency may then be added as a constraint and the additional cost required to meet this constraint is minimized. Finally, particular embodiments may consider a more general formulation of the optimization problem for consumer-producer applications that lets "entities" act as both consumers of upstream and producers and producers to downstream consumers.

In particular embodiments, the connection network $G(V,F)$ is a bi-partite graph from producers to consumers. When consumer $c_i$ performs a query for contents, a number of contents need to be provided for $c_i$'s feed. Both of the coherency cases described above are considered for this scenario. In the global coherency case, particular embodiments supply the most recent $\pi_g$ contents across all producers in $F_i$ (i.e., the set of producers that $c_i$ follows). In the per-producer coherency case, particular embodiments supply the most recent $\pi_p$ contents for each producer in $F_i$.

Any system comes with its own push and pull costs, depending on storage decisions for the ProducerPivoted content store and the ConsumerPivoted feed view store. Let $H_i$ denote the cost to push a content to $c_i$'s feed, and $L_j$ denote the cost to pull a constant number of contents from producer $p_j$. In most cases, particular embodiments may assume that $\pi_g$ and $\pi_p$ are both small enough that $L_j$ will be the same for each. particular embodiments may further assume that multiple contents may be retrieved using a pull from a single producer. This assumes that contents are clustered by producer; that a single remote procedure call may retrieve multiple contents; and that the disk cost (if any) for retrieving contents is constant for a small number of contents (e.g., since the cost is dominated by a disk seek).

Particular embodiments may assume a simple model where contents arrive in the system individually, and do not consider the cost for ingesting contents and writing them to the ProducerPivoted table, which may be the same for all policies considered. Thus, the granularity at which the push-pull decisions may be made is per-content, per-consumer, and particular embodiments may independently choose push or pull for each such pair. The system cost may be analyzed at this granularity as well.

Furthermore, particular embodiments may assume that the $H_i$ and $L_j$ costs are constant, even as load increases in the system. However, if the system bottleneck changes with increasing content rate or producer fan-out, this assumption may not be true. For example, particular embodiments may decide to materialize data in memory. On the other hand, if there is a limited amount of main memory, and the total size of ConsumerPivoted grows beyond the aggregate RAM of the system, then it may spill to disk, changing the push and pull cost to include disk access. Usually in practice, a consumer-producer application can provision enough resources (e.g. memory, bandwidth, CPU etc.) to avoid these bottleneck changes and keep $H_i$ and $L_j$ constant. In particular embodiments, the analysis does not assume data is wholly in memory, but does assume the costs are constant as the system scales.

First, cost optimization with respect to per-producer coherency is described in more detail. For consumer $c_i$, producer $p_j$, and content $ct_{j,k}$, particular embodiments derive the lifetime cost to deliver $ct_{j,k}$ to $c_i$. In particular embodiment, the lifetime of $ct_{j,k}$ is the time from its creation to the time when $p_j$ has produced $\pi_p$ subsequent contents.

Particular embodiments make the following observation:

OBSERVATION 1. Assume that pull cost is amortized over all contents acquired with one pull, and that push and pull cost are constant. The push and pull lifetime costs for an content by $p_j$ for $c_i$ depend on the consumer's content-query rate $\phi_{c_i}$ and the producer's content-producing rate $\phi_{P_j}$.

Push=$H_i$

Pull=$L_j(\phi_{c_i}/\phi_{P_j})$

OBSERVATION 1 may be proved as the following. Push cost is oblivious to content lifetime; $H_i$ is paid once ever for a particular content. On the other hand, pull cost does depend on content lifetime. Content $ct_{j,k}$ has lifetime $\pi_p/\phi_{P_j}$. Over this lifetime, the number of times $c_i$ sees $ct_{j,k}$ is $\phi_{c_i}(\pi_p/\phi_{P_j})$. The cost to pull $ct_{j,k}$ is $L_j/\pi_p$ ($L_j$ amortized over each pulled content). Thus, lifetime cost for $ct_{j,k}$ is $L_j(\phi_{c_i}/\phi_{P_j})=(L_j/\pi_p)\phi_{c_i}(\pi_p/\phi_{P_j})$.

Then, particular embodiments may conclude that for a given (producer, consumer) pair, contents should be pushed if the push cost is lower than the pull cost; otherwise, contents should be pulled if the pull cost is lower than the push cost. Particular embodiments may derive the optimal decision rule from the resulting inequality as follows:

LEMMA 1.

If $(\phi_{c_i}/\phi_{P_j}) \geq H_i/L_j$, then push for all contents by $p_j$.

If $(\phi_{c_i}/\phi_{P_j}) < H_i/L_j$, then pull for all contents by $p_j$.

Here, the push vs. pull decision draws directly from the costs in OBSERVATION 1.

Second, cost optimization with respect to global coherency is described in more detail. With the global coherency requirement, consumer $c_i$'s feed contains the $\pi_g$ most recent contents across all producers in $F_i$ (i.e., the set of all producers that $c_i$ follows).

Particular embodiments make the following observation:

OBSERVATION 2. Assume that push and pull costs are constant.

Push = $H_i$

Pull = $L_j \phi_{c_i} / \sum_{p_j \in F_i} \phi_{P_j}$

OBSERVATION 2 may be proved similarly as the per-producer case, with a few key differences. Producer content-producing frequency is an aggregate over all of $F_i$:

$$\phi_{F_i} = \sum_{p_j \in F_i} \phi_{P_j}.$$

Content $ct_{j,k}$ has lifetime $\pi_g/\phi_{F_i}$, and its amortized pull cost is $L_j/\pi_g$. These terms may be substituted in the per-producer analysis to reach the push and pull costs for global coherency.

Particular embodiments may then derive the optimal decision rule for a (producer, consumer) pair in the global coherency case as follows:

LEMMA 2.

If $\phi_{c_i} / \sum_{p_j \in F_i} \phi_{P_j} \geq H_i/L_j$, then push for all contents by $p_j$.

-continued

If $\phi_{c_i} / \sum_{p_j \in F_i} \phi_{p_j} < H_i/L_j$, then pull for all contents by $p_j$.

Here, the push vs. pull decision draws directly from the costs in OBSERVATION 2.

The main findings from LEMMAS 1 and 2 may be summarized as follows. Under per-producer coherency, the lifetime cost for delivering a content to a particular consumer is dependent on both the consumer's content-consuming frequency and the content-producing frequency of the producer of the content. Under global coherency, the lifetime cost for delivering a content to a consumer is dependent on both the consumer's content-consuming frequency and the aggregate content-producing frequency of the producers that the consumer follows. Consequently, particular embodiments suggest the following two theorems.

THEOREM 1. For per-producer coherency, the globally optimal plan that minimizes system cost is derived by separately choosing push or pull for each (producer, consumer) pair, with push vs. pull per (producer, consumer) pair determined by LEMMA 1.

With per-producer coherency, particular embodiments minimize global cost by minimizing the cost paid for every content. Similarly, particular embodiments minimize the cost for a content by minimizing the cost paid for that content for every consumer. LEMMA 1 assigns each edge to minimize the cost paid for a single content on an edge between a consumer and a producer. Further, no assignment made on any one edge imposes any restrictions on the assignments that can be made to any other edges. Therefore, minimizing cost for every consumer and content minimizes global cost.

THEOREM 2. For global coherency, the globally optimal plan that minimizes system cost is derived by separately choosing push or pull for each consumer, with push vs. pull per consumer determined by LEMMA 2.

With global coherency, LEMMA 1 assigns all edges either push or pull. Again, no edge assignment restricts any other edge assignments. Therefore, minimizing cost for every consumer and content minimizes global cost. Hereafter, let MinCost represent the minimum cost.

THEOREMS 1 and 2 have important practical implications. Any system may be subject to different content-query and content-producing rates, and skew controlling which consumers or producers contribute most to these rates. In practice, to optimize system cost, there is no need to extract or understand these patterns. Instead, to optimally make push vs. pull decisions, particular embodiments need only separately measure consumer's content-query rate and compare it to the content-producing rate of the producers that the consumer follows, either individually or in aggregate.

Third, the cost optimization problem is analyzed under the additional constraint of query latency (i.e., optimizing query latency as well as minimizing cost), which may be represented as satisfying a latency service level agreement (SLA). In the context of computer network, SLA may be used to control the allocation to and use of computing resources by individual network entities or components. For example, a particular follows application may enforce that 95% of feed queries execute in less than 100 ms. It is possible that, in some cases, the minimal push cost vs. pull cost strategy also meets the SLA. But in other cases, it may not; and if not, particular embodiments may be able to trade pull for push (recall that push does less work at content-query time), thus raising system cost but lowering latency. In certain cases, particular embodiments may move to a push-only strategy and still not meet a very stringent SLA. Hereafter, let LatencyConstrainedMinCost represent a minimum cost that also satisfies a query latency constraint.

The following analysis is directed toward the middle case, where pushing may help, but at a cost. In practice, it is difficult to predict a priori for a given system how much additional pushing it takes to meet an SLA. Particular embodiments therefore may employ a greedy algorithm with which the amount of additional pushing may be incrementally adjusted, until the result converges on the SLA. Though not optimal, it is reasonable for many practical settings. In the following analysis, particular embodiments assume knowledge of the target amount of pushing.

Suppose that MinCost produces a latency of $\lambda_m$. The analysis is premised on the assumption that to meet the SLA, some fraction $\lambda_l$ of all queried (consumer, producer) pairs need to be pushed, and that the minimal cost solution pushes a fraction $\lambda_o$ of pairs, where $\lambda_o \leq \lambda_l$. Particular embodiments define E as the penalty in terms of cost paid when shifting a (consumer, producer) pair from pull to push. Formally, $\epsilon_{i,j} = \phi_{P_j}(H - L_j(\phi_{c_i}/\phi_{P_j}))$ for per-producer coherency. This is the extra cost paid per content for doing push instead of pull, multiplied by $p_j$'s content-producing rate.

The benefit of shifting a consumer-producer edge $f_{i,j}$ from pull to push comes from reducing the time taken to acquire contents at content-query time (i.e., at the time the consumer consumes the contents), and depends on the fraction of queries that $\phi_{c_i}$ contributes to the overall content-query rate. Intuitively, more benefit may be gained from pushing for a high content-query frequency consumer than a low content-query frequency consumer. Note that this means the value of $\lambda_l$ is not known a priori, since the size of $\lambda_l$ depends on which edges end up being converted to push.

In particular embodiments, the problem is to choose which (consumer, producer) pairs to shift from pull to push. Particular embodiments may reduce this to an instance of the "knapsack problem". The goal of a knapsack problem typically is to fill the knapsack with objects, where each object contributed a certain "score". Each object has a "weight", and the objective is to maximize the sum of the scores while not exceeding the weight limit. Particular embodiments abstract (producer, consumer) pairs to be "objects" (i.e., each (producer, consumer) pair is considered as an object). An object $o_k$ has score $\phi_k$ and weight $\epsilon_k$, where $\phi_k$ is equivalent to the consumer's content-query rate and $\epsilon_k$ the penalty (e.g. extra cost resulted from shift from pull to push). The goal is to shift enough objects from pull to push such that a $\lambda_l$ fraction of all objects are pushed. Therefore, of the objects pulled in the optimal solution, particular embodiments need to shift objects with total score $\lambda_l - \lambda_o$ to push.

Consider the set of edges pulled in MinCost. To find LatencyConstrainedMinCost, the problem is to choose a subset of these edges S to shift to push, such that $$\sum_S \sigma_{i,j} \geq (\lambda_m - \lambda_l) \text{ and } \sum_S \varepsilon_{i,j}$$

is minimized. The problem of solving directly for S is similar to the knapsack problem, but subtly different. There is no "capacity" constraint. While the latency needs to be decreased at least by $\lambda_m - \lambda_l$, it is possible to decrease the latency even more. The problem is similar to the knapsack problem.

There are still two practical issues remaining to be considered. First, knapsack problems are NP-hard. Second, although in theory, $\sigma_{i,j}$ defined as the reduction in latency from shifting $f_{i,j}$ to push, in practice, it is very difficult to accurately predict the benefit gained by shifting an edge to push. Particular embodiments may resolve these two issues with an adaptive algorithm. Although it is difficult to know the exact latency reduction from shifting an edge to push, intuition suggests that choosing consumers with higher content-consuming frequencies should result in a greater reduction, since this reduces latency for more feed retrievals. As a proxy, then, particular embodiments set $\sigma_{i,j}=\phi_{c_i}$. As a consequence of using this proxy, although the relative benefits of the edges are known, it is not directly known if a candidate set of edges S reduces latency by $\lambda_m-\lambda_l$. Thus, particular embodiments start by estimating a $\Sigma\phi_{c_i}$ that does reduce latency by $\lambda_m-\lambda_l$ and solve for S, and then measure in practice if S gives the LatencyConstrainedMinCost solution (i.e., exactly meets the SLA). If latency is still too high, one needs to solve for a larger $\Sigma\phi_{c_i}$; and if latency is lower than the SLA, one needs to solve for a smaller $\Sigma\phi_{c_i}$. Thus, it is not likely to produce the correct solution immediately.

Particular embodiments looks for a solution that incurs only incremental cost when the target $\Sigma\phi_{c_i}$ is adjusted. Moreover, the knapsack problem is NP-hard, so the solution needs to provide a suitable approximation of the optimal solution. To address both concerns, particular embodiments use an adaptive algorithm that produces a greedy approximation of the optimal solution. Such a greedy approximation is expected to be effective in practice. Particular embodiments may sort the pull edges by $\phi_{c_i}/\epsilon_{i,j}$ in descending order, and then shift some number of the top-ranked edges to push. If the latency is higher than the SLA, one may incrementally shift the top-ranked pull edges to push. If the latency is lower than the SLA, one may incrementally shift the lowest-ranked push edges to pull. Note that particular embodiments never shift edges to pull if they are assigned to push in MinCost.

The adaptive algorithm may be run from MinCost as a starting point. Particular embodiments also periodically re-run the algorithm to ensure that the LatencyConstrainedMinCost solution is obtained. Suppose, for example, a number of consumers add new interests (e.g., new (producer, consumer) pairs), and the system, optimizing for MinCost, chooses the pull strategy for them. These new (producer, consumer) pairs may cause latency to increase, even though the push/pull decisions have not changed for the existing (producer, consumer) pairs. Thus, the adaptive algorithm needs to be re-run to shift more edges to push in order to shift the system to LatencyConstrainedMinCost again.

While this algorithm does not always find the optimal solution, it is most likely to be adequate in practice, and much more practical. In particular embodiments, the push vs. pull decisions are embedded in the system. The greedy solution has the advantage that it efficiently adapts to different goal latencies. In order to meet the SLA, the system may simply add objects to S until the desired latency has been reached.

Note also that the solution found by the greedy algorithm is specific to a particular instance of the connection network. In particular, after optimization has been performed for latency, consumers may declare new interests (e.g., establishing new consumer-producer pairs), and the system may choose the pull strategy for those pairs based on the push vs. pull decision criteria. In such case, these new consumer-producer pairs may cause the average or 95th percentile latency to increase, even though push/pull decisions have not changed for existing consumer-producer pairs. Thus, particular embodiments may periodically re-run the greedy algorithm to ensure that the latency SLA is met even as the connection network changes.

In particular embodiments alternative to shifting individual (consumer, producer) pairs from pull to push, the consumers may be moved from pull to push as blocks. That is, when moving (consumer, producer) pairs from pull to push, particular embodiments select consumers with some pull (consumer, producer) pairs, and move all of them from pull to push at once. More specifically, since a consumer may consume contents produced by multiple producers, with each of the producers the consumer follows, there is a (consumer, producer) pair. Thus, for a particular consumer, some of its (consumer, producer) pairs may be determined to have the pull strategy and other of its (consumer, producer) pairs may be determined to have the push strategy. Particular embodiments may select such a consumer and move all of its (consumer, producer) pairs to push. The intuition is that to execute a single consumer content query with low latency, one needs to move all producers for that consumer to push; otherwise, the time to pull from even one producer will dominate the content-query time for the consumer. In this case, particular embodiments compute $\epsilon$ for an entire consumer $c_i$ as $$\varepsilon_i = H_i - L_j\phi_{c_i} \bigg/ \sum_{p_j \in F_i} \phi_{p_j}.$$

Further, $\lambda_l$ shifts from being a fraction of all queried (consumer, producer) pairs to being a fraction of all consumer queries. With these changes, the knapsack reduction is the same.

Moving consumers wholesale has the benefit of not leaving a few "long poles" for each consumer at query time. Its weakness, however, is that it may be harder to optimize latency, as the degrees of freedom have been reduced. In particular, in some cases, one may want to move a particular (producer, consumer) pair to push, but may be unable to because moving the entire consumer excessively increases system cost. Note that the distinction in the strategies comes from whether particular embodiments break the producers a consumer follows into separate objects or treat them as a block. Thus, the question only exists in per-producer coherency. In global coherency, since content lifetime is a function of the content-producing frequencies of all of a consumer's producers, all of a consumer's producers have the same benefit (i.e., the consumer's content-consuming frequency) and same penalty (i.e., the aggregate content-producing frequency of the pulled producers). Thus, with global coherency, it is irrelevant whether particular embodiments define the objects as (consumer, producer) pairs or consumer blocks.

Finally, the situation where an entity is both a consumer (e.g., with respect to a upstream producer) and a producer (e.g., with respect to a downstream consumer) is discussed briefly. The analysis thus far has mainly focused on simple connection networks, where each node is either a producer or consumer. That is, the network is a bipartite graph. The basis of the optimizations is that each edge in this graph may be optimized separately, and in turn achieving a global optimization. Suppose, instead, there is a composite connection network, where some nodes may be both a consumer relative to upstream content sources (i.e., upstream producers) and a producer relative to downstream consumers. For example, there may be a node in the graph that aggregates "Madonna" contents from several sources, and then makes them available to downstream consumers. In particular embodiments, the optimization problem is still to assign push or pull to edges to minimize system cost. There is risk, however, that the push vs. pull decision may be not determined for each edge independently.

To characterize this risk, consider the property of "network viability". In particular embodiments, a network is viable if and only if, for each edge assigned push, each adjacent upstream edge is also assigned push. As an example of a non-viable network, consider a pair of edges where a push edge has an upstream pull edge. While the push edge expects to transmit contents from its associated producer to its associated consumer as they are generated, the upstream pull edge does not deliver contents as they are generated.

In particular embodiments, an additional constraint may be added to cope with the risk such that either solving the push and pull costs and content-producing and contenting-consuming frequencies also guarantees a viable solution, or finding an approximation for the minimal cost viable solution.

Figure 3:
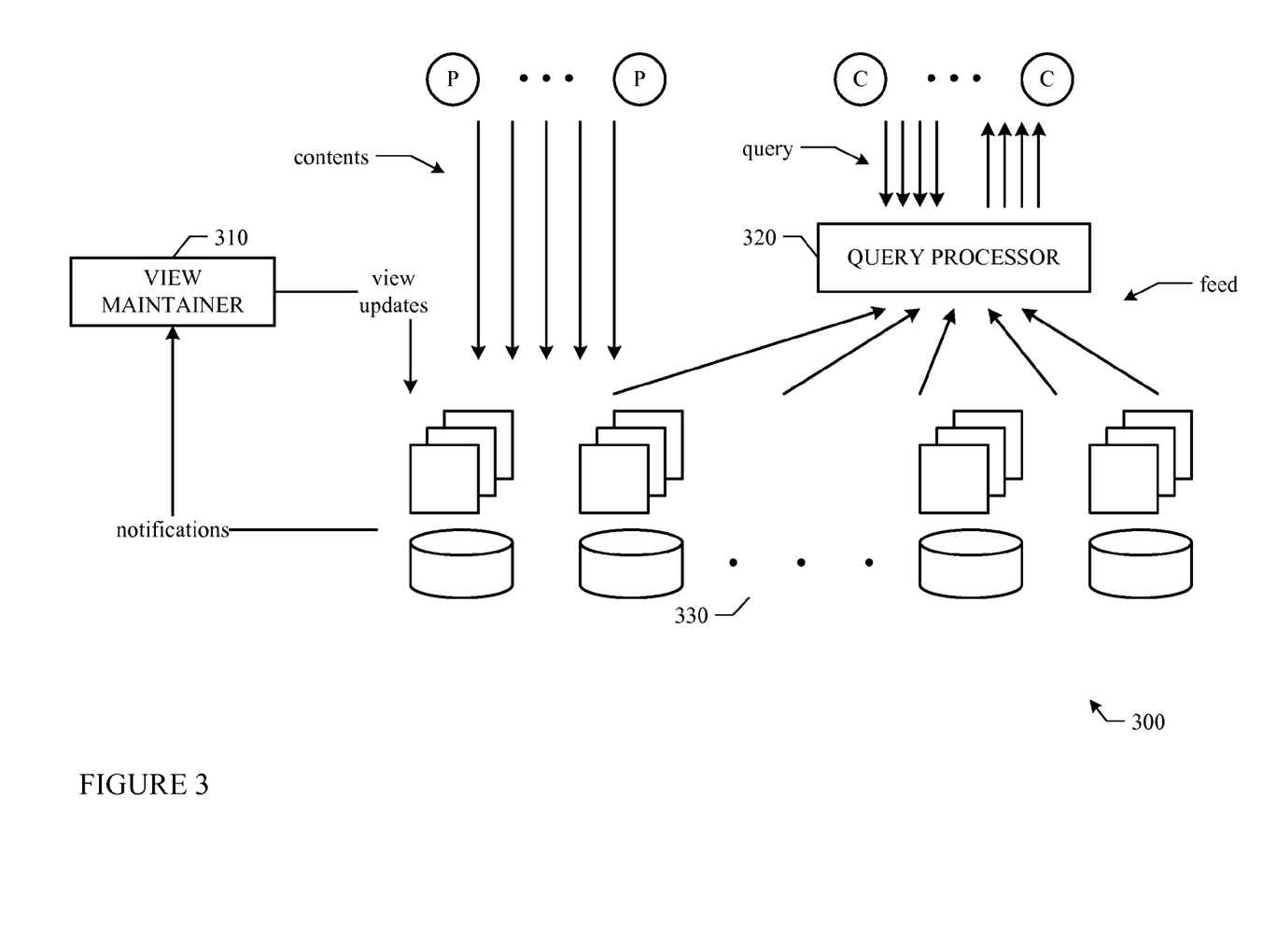
FIG. 3 illustrates an example system architecture for determining strategies for individual content feeds.

FIG. 3 illustrates an example system architecture 300 suitable for implementing embodiments of the present disclosure. In particular embodiment, system 300 includes a view maintenance mechanism (e.g., a view maintainer) 310 and a web serving database 330. In particular embodiments, the materialization decisions are encapsulated in view maintenance mechanism 310, and web serving database 330 handles other tasks such as processing updates and feed views.

In particular embodiments, web serving database 330 is elastically scalable and may include any number of storage servers. When a producer generates an content, it is stored in the storage servers, clustered by producer. A producer may be, for example, an application layer (e.g., if users directly generate contents) or a crawler/ingest layer (e.g., to retrieve contents from external sources). When an content enters system 300, it may send a notification to view maintainer 310. View maintainer 310 responds to this notification by deciding whether to push the new content to one or more consumer feed records. In particular embodiments, because the decision depends on the content-producing rate of the producer and the content-query rate of the consumer, view maintainer 310 may read this information from web serving database 330. If the content is pushed, it is written back to the storage servers, this time into the consumer-clustered feed view.

Particular embodiments use the "notification" mechanism, which is similar to simple triggers (as they fire whenever an update is committed), primarily to drive index and view maintenance. Alternative embodiments may use other mechanism to alter view maintainer 310, such as updating the view as a part of the original update transaction, sniffing the database log, etc. Notifications have the advantage that view maintenance is done asynchronously, so particular embodiments can perform the potentially expensive materialization, including reading the producer and consumer rates, without adding latency to the original update transaction. The disadvantage of the notification approach may be that the materialized view may be slightly stale compared to the base content store; however, a small degree of staleness is usually acceptable in web applications (including follows applications).

In particular embodiments, when a consumer retrieves its view (e.g., when a user logs in or refreshes his page), this results in a query to a query processor 320. Query processor 320 reads the consumer's record from ConsumerPivoted in order to: (1) retrieve the already materialized (pushed) contents; and (2) determine from which producers contents need to be pulled. Then, parallel reads may be made to Producer-Pivoted to pull those contents. In particular embodiments, a consumer's feed view record includes both materialized contents and a list of non-materialized producers that the consumer is following.

Particular embodiments may store both the base content store (clustered by producer) and the materialized feed views (clustered by consumer) in the same database infrastructure. Alternatively, particular embodiments may store Producer-Pivoted in one database and ConsumerPivoted in another.

In particular embodiments, web serving database 330 is designed to provide low-latency reads and writes of individual records. Throughput (handling many such read and write operations) is increased via "scale-out", that is, by adding more servers to the system. In particular embodiments, system 300 provides ordered storage of records, so that small ranges of records may be retrieved efficiently. Range scans may be particularly important for efficient push and pull operations. Particular embodiments may elect to provision enough main-memory to store relevant data to ensure low latency, although data is also persisted to disk to survive failures.

In particular embodiments, when a producer generates an content, it needs to be written into the ProducerPivoted table. In some cases, the producer may write the content directly into the storage layer. In other cases, producers may be aggregators of upstream content. The upstream sources may push contents to the aggregator, or the aggregator may have to pull contents, in either case using, for example, a suitable Application Programming Interface (API).

In particular embodiments, when a new content is generated by a producer, it is the responsibility of view maintainer 310 to decide whether to push that content by materializing it in one or more consumer records. Thus, view maintainer 310 encapsulates the decision rules of LEMMA 1 and LEMMA 2. In particular embodiments, view maintainer 310 subscribes to updates on tables from database 330 and writes records back to database 330 when necessary.

Particular embodiments may store the relevant data (e.g., ConnectionNetwork, ProducerPivoted, or ConsumerPivoted) in suitable data structures, such as, for example and without limitation, tables. For example, a ConnectionNetwork table may be used to store the connection graph between consumers and producers. The key of the table is the composite (producer, priority, consumer). The priority is calculated from the consumer's content-query rate and the producer's content-producing rate, according to LEMMAS 1 and 2. The ConnectionNetwork table may be sorted by producer, and then priority, to simplify the decision making about whether to push an content. When a new content arrives, particular embodiments do a range query over the records prefixed with the content's producer, starting at priority R, where R is the derived optimal threshold (e.g., $H_i/L_j$). This allows quick retrieval of only the (producer, consumer) pairs with a priority greater than R, which are the set of consumers for which the content should be materialized.

As another example, contents may be stored in a Contents-ByProducer table. The key of this table is (producer, timestamp) so that contents are clustered by producer, and ordered by producing time within a producer. Such ordering facilitates efficient retrieval of the latest contents from a given producer. This retrieval may be implemented by a range scan with a specified limit on the number of contents to retrieve (since a feed typically only shows the most recent N contents).

As yet another example, the materialized feed records for each consumer may be stored in a Feed table. The key of this table is (consumer, producer), so that there is a separate record for each producer that a consumer follows. If the consumer decides to follow a new producer, a new Feed record is inserted, initially with no contents. When view maintainer 310 is notified of a new content, it performs a range scan on the ConnectionNetwork table to find the list of consumers to whom to push the content, and updates the appropriate Feed record for each consumer. The result is that some feed records have contents materialized, while others have null. The Feed record may also include the priority for the (consumer, producer) pair, which is the same priority stored in the ConnectionNetwork table. If a Feed record has no contents (e.g., null), particular embodiments need only pull from ContentsByProducer if the priority is below the threshold $H_i/L_j$. A null record with priority above the threshold indicates that contents will be pushed, but the producer has not yet generated any. In addition, potentially multiple contents are stored in the column reserved for "contents" in the Feed table, and the same content may be stored for multiple consumers, which is resulted from producer fan-out.

As producer content-producing rates and consumer content-query rates change, particular embodiments may adapt the priorities for (consumer, producer) pairs. The statistics on each producer's rate may be maintained in its corresponding ContentsByProducer record, and the statistics on each consumer's rate may be maintained in its corresponding Feed record. An observation is to be lazy in updating stats and priorities. To reduce the number of writes to update stat, particular embodiments may maintain approximate stats and only update them with some probability on each content or query. To reduce the number of writes to update priorities, particular embodiments may only perform the update if the old and new priorities lie on opposite sides of the push threshold.

Figure 4:
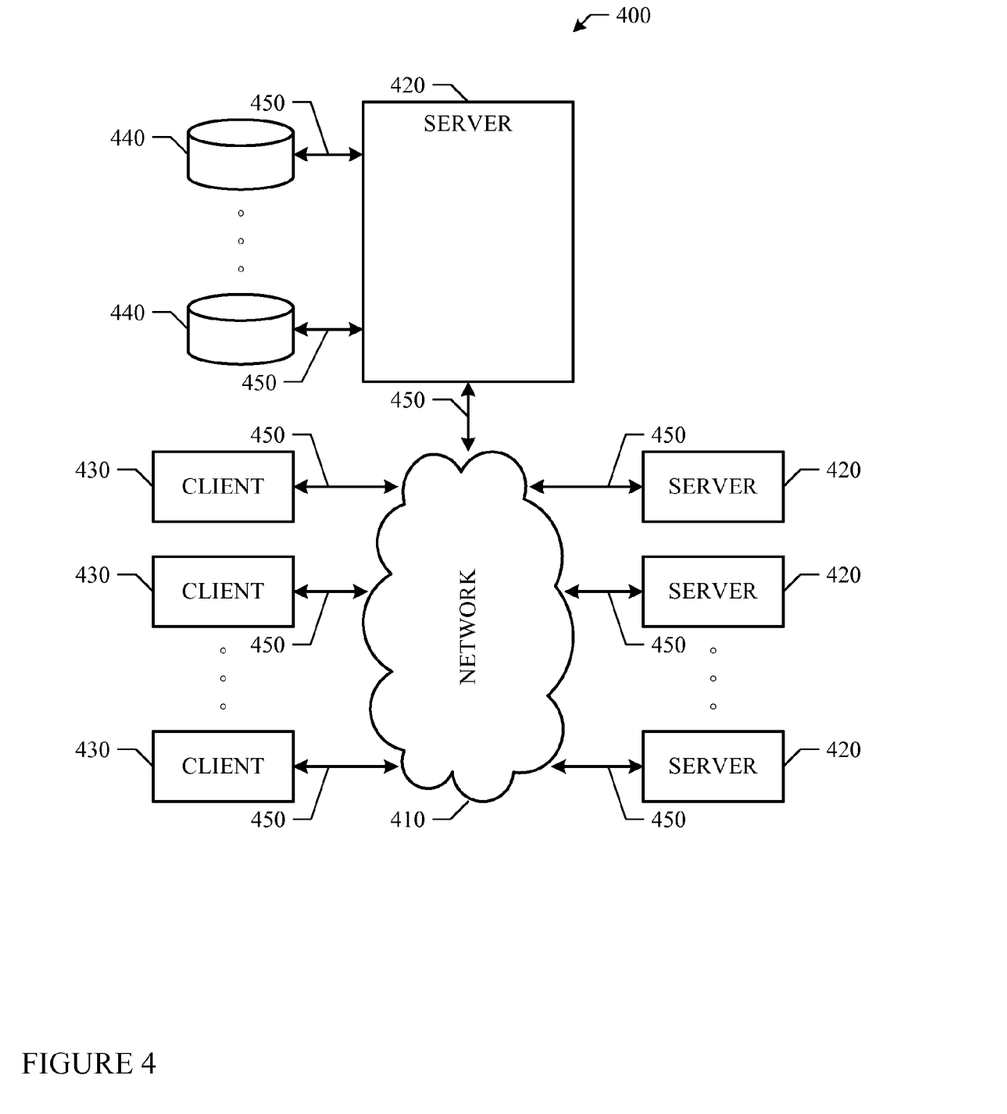
FIG. 4 illustrates an example network environment.

Particular embodiments may be implemented in a network environment. FIG. 4 illustrates an example network environment 400 suitable for providing software validation as a service. Network environment 400 includes a network 410 coupling one or more servers 420 and one or more clients 430 to each other. In particular embodiments, network 410 is an intranet, an extranet, a virtual private network (VPN), a local area network (LAN), a wireless LAN (WLAN), a wide area network (WAN), a metropolitan area network (MAN), a portion of the Internet, or another network 410 or a combination of two or more such networks 410. The present disclosure contemplates any suitable network 410.

One or more links 450 couple a server 420 or a client 430 to network 410. In particular embodiments, one or more links 450 each includes one or more wireline, wireless, or optical links 450. In particular embodiments, one or more links 450 each includes an intranet, an extranet, a VPN, a LAN, a WLAN, a WAN, a MAN, a portion of the Internet, or another link 450 or a combination of two or more such links 450. The present disclosure contemplates any suitable links 450 coupling servers 420 and clients 430 to network 410.

In particular embodiments, each server 420 may be a unitary server or may be a distributed server spanning multiple computers or multiple datacenters. Servers 420 may be of various types, such as, for example and without limitation, web server, news server, mail server, message server, advertising server, file server, application server, exchange server, database server, or proxy server. In particular embodiments, each server 420 may include hardware, software, or embedded logic components or a combination of two or more such components for carrying out the appropriate functionalities implemented or supported by server 420. For example, a web server is generally capable of hosting websites containing web pages or particular elements of web pages. More specifically, a web server may host HTML files or other file types, or may dynamically create or constitute files upon a request, and communicate them to clients 430 in response to HTTP or other requests from clients 430. A mail server is generally capable of providing electronic mail services to various clients 430. A database server is generally capable of providing an interface for managing data stored in one or more data stores.

In particular embodiments, one or more data storages 440 may be communicatively linked to one or more severs 420 via one or more links 450. In particular embodiments, data storages 440 may be used to store various types of information. In particular embodiments, the information stored in data storages 440 may be organized according to specific data structures. In particular embodiment, each data storage 440 may be a relational database. Particular embodiments may provide interfaces that enable servers 420 or clients 430 to manage, e.g., retrieve, modify, add, or delete, the information stored in data storage 440.

In particular embodiments, each client 430 may be an electronic device including hardware, software, or embedded logic components or a combination of two or more such components and capable of carrying out the appropriate functionalities implemented or supported by client 430. For example and without limitation, a client 430 may be a desktop computer system, a notebook computer system, a netbook computer system, a handheld electronic device, or a mobile telephone. The present disclosure contemplates any suitable clients 430. A client 430 may enable a network user at client 430 to access network 430. A client 430 may enable its user to communicate with other users at other clients 430.

A client 430 may have a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 430 may enter a Uniform Resource Locator (URL) or other address directing the web browser 432 to a server 420, and the web browser 432 may generate a Hyper Text Transfer Protocol (HTTP) request and communicate the HTTP request to server 420. Server 420 may accept the HTTP request and communicate to client 430 one or more Hyper Text Markup Language (HTML) files responsive to the HTTP request. Client 430 may render a web page based on the HTML files from server 420 for presentation to the user. The present disclosure contemplates any suitable web page files. As an example and not by way of limitation, web pages may render from HTML files, Extensible HyperText Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 5:
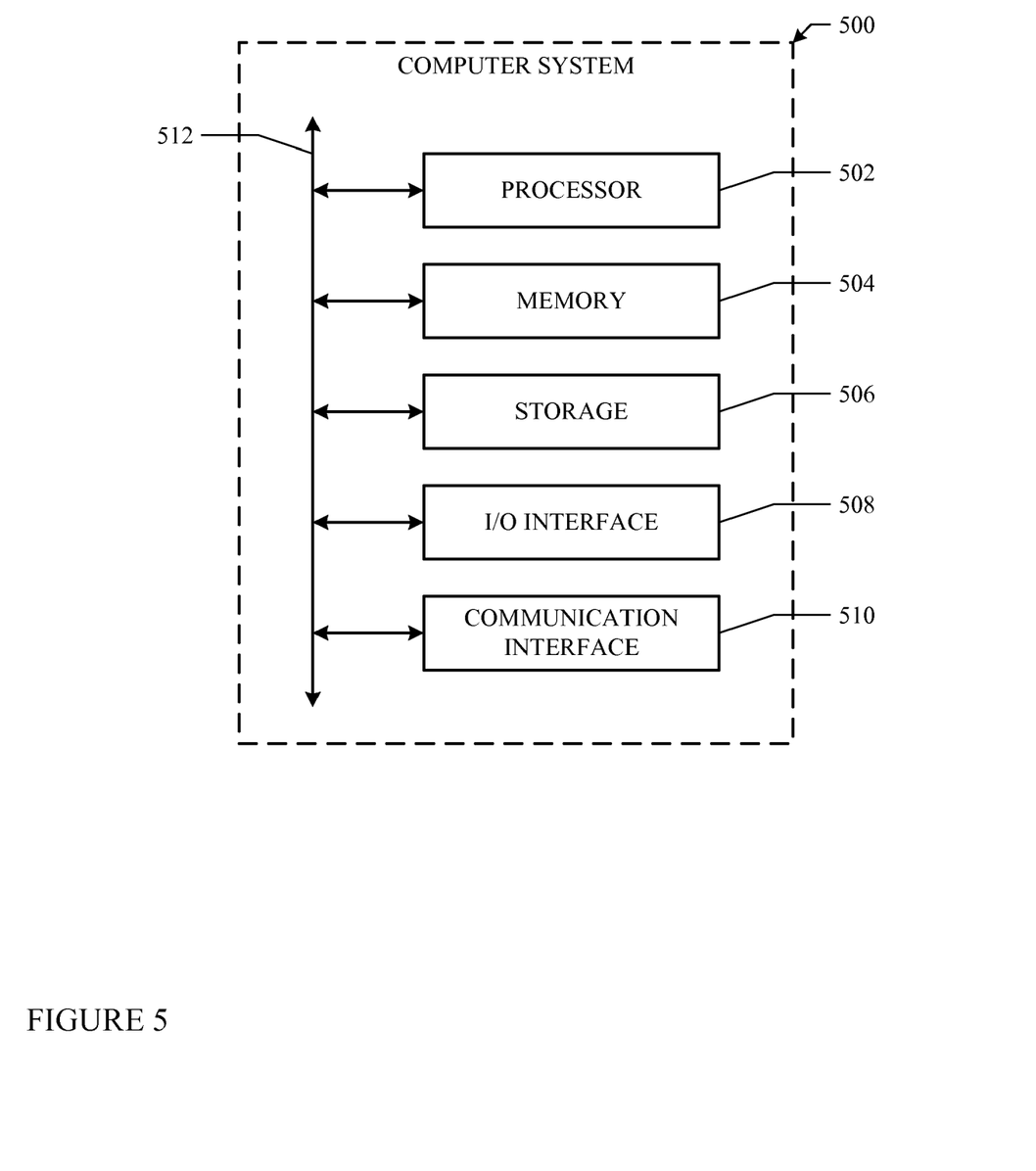
FIG. 5 illustrates an example computer system.

Particular embodiments may be implemented on one or more computer systems. FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. The present disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. The present disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising: by one or more computing devices, for each one of one or more content producers, accessing a content-producing rate at which the content producer produces one or more items of content;

for each one of one or more content consumers, accessing a content-consuming rate at which the content consumer consumes one or more items of content; and for each one of a plurality of consumer-producer pairs, wherein the consumer-producer pair comprises one of the content consumers and one of the content producers, and the content consumer follows the content producer, selecting between a push strategy and a pull strategy for delivering one or more items of content from the content producer to the content consumer based on the content-consuming rate of the content consumer and the content-producing rate of the content producer, wherein:

with the push strategy, each one of the items of content is delivered from the content producer to the content consumer when the item of content is produced by the content producer; and with the pull strategy, each one of the items of content is delivered from the content producer to the content consumer when the item of content is consumed by the content consumer.

2. The method recited in claim 1, wherein for each one of the consumer-producer pairs, if a ratio between the content-consuming rate of the content consumer and the content-producing rate of the content producer is greater than a threshold, then select the push strategy; and if the ratio between the content-consuming rate of the content consumer and the content-producing rate of the content producer is less than the threshold, then select the pull strategy.

3. The method recited in claim 1, wherein for each one of the consumer-producer pairs, the push strategy or the pull strategy is selected by minimizing a cost while maintaining a global coherency, wherein:

the cost is a total resource cost of delivering the items of content between the consumer-producer pairs, and the global coherency guarantees that for each one of the content consumers, the items of content are delivered in an order according to timestamps of all the items of content produced by all the content producers that the content consumer follows, wherein the timestamp of each item of content indicates the time the item of content is produced.

4. The method recited in claim 3, wherein for each one of the consumer-producer pairs, let:
c denote the content consumer,
p denote the content producer,
$P_c$ denote all the content producers that c follows, including p
$p_j$ denote a content producer in $P_c$,
$\phi_c$ denote the content-consuming rate of c,
$\phi_{p_j}$ denote the content-producing rate of $p_j$,
$C_{push}$ denote the cost to push an item of content to c, and
$C_{pull}$ denote the cost to pull a constant number of items of content from p, then:
if
$$\phi_c \Big/ \sum_{p_j \in P_c} \phi_{p_j} \geq C_{push}/C_{pull},$$
then select the push strategy, and
if
$$\phi_c \Big/ \sum_{p_j \in P_c} \phi_{p_j} < C_{push}/C_{pull},$$
then select the pull strategy.

5. The method recited in claim 1, wherein for each one of the consumer-producer pairs, the push strategy or the pull strategy is selected by minimizing a cost while maintaining a per-producer coherency, wherein:

the cost is a total resource cost of delivering the items of content between the consumer-producer pairs, and the per-producer coherency guarantees that for each one of the content consumers, the items of content from each one of the content producers that the content consumer follows are delivered in a order according to timestamps of all the items of content produced by the content producer, wherein the timestamp of each item of content indicates the time the item of content is produced.

6. The method recited in claim 5, wherein for each one of the consumer-producer pairs, let:
c denote the content consumer,
p denote the content producer,
$\phi_c$ denote the content-consuming rate of c,
$\phi_p$ denote the content-producing rate of p,
$C_{push}$ denote the cost to push an item of content to c, and
$C_{pull}$ denote the cost to pull a constant number of items of content from p, then:
if $(\phi_c/\phi_p) \geq C_{push}/C_{pull}$, then select the strategy, and if $(\phi_c/\phi_p) < C_{push}/C_{pull}$, then select the pull strategy.

7. The method recited in claim 6, wherein for each one of the consumer-producer pairs, the push strategy or the pull strategy is selected by further satisfying a latency service level agreement; and the method further comprising if the latency service level agreement is not satisfied, then:
selecting one or more of the consumer-producer pairs that have the pull strategy; and
shifting the selected consumer-producer pairs to the push strategy.

8. The method recited in claim 1, further comprising:

for a first one of the content consumers, accessing a content-consuming pattern with respect to a time period; and for a first one of the consumer-producer pairs, wherein the first consumer-producer pair comprises the first content consumer and one of the content producers, selecting between the push strategy and the pull strategy for delivering one or more items of content from the content producer to the first content consumer further based on the content-consuming pattern of the first content consumer and a time at which the items of content are delivered.

9. A system, comprising:
a memory comprising instructions executable by one or more processors; and
one or more processors coupled to the memory and operable to execute the instructions, the one or more processors being operable when executing the instructions to:
for each one of one or more content producers, access a content-producing rate at which the content producer produces one or more items of content;
for each one of one or more content consumers, access a content-consuming rate at which the content consumer consumes one or more items of content;
for each one of a plurality of consumer-producer pairs, wherein the consumer-producer pair comprises one of the content consumers and one of the content producers, and the content consumer follows the content producer, select between a push strategy and a pull strategy for delivering one or more items of content from the content producer to the content consumer based on the content-consuming rate of the content consumer and the content-producing rate of the content producer, wherein:
with the push strategy, each one of the items of content is delivered from the content producer to the content consumer when the item of content is produced by the content producer; and
with the pull strategy, each one of the items of content is delivered from the content producer to the content consumer when the item of content is consumed by the content consumer.

10. The system recited in claim 9, wherein for each one of the consumer-producer pairs,
if a ratio between the content-consuming rate of the content consumer and the content-producing rate of the content producer is greater than a threshold, then select the push strategy; and
if the ratio between the content-consuming rate of the content consumer and the content-producing rate of the content producer is less than the threshold, then select the pull strategy.

11. The system recited in claim 9, wherein for each one of the consumer-producer pairs, the push strategy or the pull strategy is selected by minimizing a cost while maintaining a global coherency, wherein:
the cost is a total resource cost of delivering the items of content between the consumer-producer pairs, and
the global coherency guarantees that for each one of the content consumers, the items of content are delivered in an order according to timestamps of all the items of content produced by all the content producers that the content consumer follows, wherein the timestamp of each item of content indicates the time the item of content is produced.

12. The system recited in claim 11, wherein for each one of the consumer-producer pairs,
let:
c denote the content consumer,
p denote the content producer,
$P_c$ denote all the content producers that c follows, including p
$p_j$ denote a content producer in $P_c$,
$\phi_c$ denote the content-consuming rate of c,
$\phi_{p_j}$ denote the content-producing rate of $p_j$,
$C_{push}$ denote the cost to push an item of content to c, and
$C_{pull}$ denote the cost to pull a constant number of items of content from p,
then:
if
$$\phi_c \Big/ \sum_{p_j \in P_c} \phi_{p_j} \geq C_{push}/C_{pull},$$
then select the push strategy, and
if
$$\phi_c \Big/ \sum_{p_j \in P_c} \phi_{p_j} < C_{push}/C_{pull},$$
then select the pull strategy.

13. The system recited in claim 9, wherein for each one of the consumer-producer pairs, the push strategy or the pull strategy is selected by minimizing a cost while maintaining a per-producer coherency, wherein:
the cost is a total resource cost of delivering the items of content between the consumer-producer pairs, and
the per-producer coherency guarantees that for each one of the content consumers, the items of content from each one of the content producers that the content consumer follows are delivered in a order according to timestamps of all the items of content produced by the content producer, wherein the timestamp of each item of content indicates the time the item of content is produced.

14. The system recited in claim 13, wherein for each one of the consumer-producer pairs,
let:
c denote the content consumer,
p denote the content producer,
$\phi_c$ denote the content-consuming rate of c,
$\phi_p$ denote the content-producing rate of p,
$C_{push}$ denote the cost to push an item of content to c, and
$C_{pull}$ denote the cost to pull a constant number of items of content from p,
then:
if $(\phi_c/\phi_p) \geq C_{push}/C_{pull}$, then select the strategy, and
if $(\phi_c/\phi_p) < C_{push}/C_{pull}$, then select the pull strategy.

15. The system recited in claim 14,
wherein for each one of the consumer-producer pairs, the push strategy or the pull strategy is selected by further satisfying a latency service level agreement; and
the one or more processors are further operable when executing the instructions to: if the latency service level agreement is not satisfied, then:
select one or more of the consumer-producer pairs that have the pull strategy; and
shift the selected consumer-producer pairs to the push strategy.

16. The system recited in claim 9, wherein the one or more processors are further operable when executing the instructions to:
for a first one of the content consumers, access a content-consuming pattern with respect to a time period; and
for a first one of the consumer-producer pairs, wherein the first consumer-producer pair comprises the first content consumer and one of the content producers, select between the push strategy and the pull strategy for delivering one or more items of content from the content producer to the first content consumer further based on the content-consuming pattern of the first content consumer and a time at which the items of content are delivered.

17. One or more computer-readable tangible storage media embodying software operable when executed by one or more computer systems to:
   for each one of one or more content producers, access a content-producing rate at which the content producer produces one or more items of content;
   for each one of one or more content consumers, access a content-consuming rate at which the content consumer consumes one or more items of content; and
   for each one of a plurality of consumer-producer pairs, wherein the consumer-producer pair comprises one of the content consumers and one of the content producers, and the content consumer follows the content producer, select between a push strategy and a pull strategy for delivering one or more items of content from the content producer to the content consumer based on the content-consuming rate of the content consumer and the content-producing rate of the content producer, wherein:
      with the push strategy, each one of the items of content is delivered from the content producer to the content consumer when the item of content is produced by the content producer; and
      with the pull strategy, each one of the items of content is delivered from the content producer to the content consumer when the item of content is consumed by the content consumer.

18. The media recited in claim 17, wherein for each one of the consumer-producer pairs,
   if a ratio between the content-consuming rate of the content consumer and the content-producing rate of the content producer is greater than a threshold, then select the push strategy; and
   if the ratio between the content-consuming rate of the content consumer and the content-producing rate of the content producer is less than the threshold, then select the pull strategy.

19. The media recited in claim 17, wherein for each one of the consumer-producer pairs, the push strategy or the pull strategy is selected by minimizing a cost while maintaining a global coherency, wherein:
   the cost is a total resource cost of delivering the items of content between the consumer-producer pairs, and
   the global coherency guarantees that for each one of the content consumers, the items of content are delivered in an order according to timestamps of all the items of content produced by all the content producers that the content consumer follows, wherein the timestamp of each item of content indicates the time the item of content is produced.

20. The media recited in claim 19, wherein for each one of the consumer-producer pairs,
   let:
      c denote the content consumer,
      p denote the content producer,
      $P_c$ denote all the content producers that c follows, including p
      $p_j$ denote a content producer in $P_c$,
      $\phi_c$ denote the content-consuming rate of c,
      $\phi_{p_j}$ denote the content-producing rate of $p_j$,
      $C_{push}$ denote the cost to push an item of content to c, and
      $C_{pull}$ denote the cost to pull a constant number of items of content from p,
   then:
      if
      $$\phi_c \Big/ \sum_{p_j \in P_c} \phi_{p_j} \geq C_{push}/C_{pull},$$
      then select the push strategy, and
      if
      $$\phi_c \Big/ \sum_{p_j \in P_c} \phi_{p_j} < C_{push}/C_{pull},$$
      then select the pull strategy.

21. The media recited in claim 17, wherein for each one of the consumer-producer pairs, the push strategy or the pull strategy is selected by minimizing a cost while maintaining a per-producer coherency, wherein:
   the cost is a total resource cost of delivering the items of content between the consumer-producer pairs, and
   the per-producer coherency guarantees that for each one of the content consumers, the items of content from each one of the content producers that the content consumer follows are delivered in a order according to timestamps of all the items of content produced by the content producer, wherein the timestamp of each item of content indicates the time the item of content is produced.

22. The media recited in claim 21, wherein for each one of the consumer-producer pairs,
   let:
      c denote the content consumer,
      p denote the content producer,
      $\phi_c$ denote the content-consuming rate of c,
      $\phi_p$ denote the content-producing rate of p,
      $C_{push}$ denote the cost to push an item of content to c, and
      $C_{pull}$ denote the cost to pull a constant number of items of content from p,
   then:
      if $(\phi_c/\phi_p) \geq C_{push}/C_{pull}$, then select the strategy, and
      if $(\phi_c/\phi_p) < C_{push}/C_{pull}$, then select the pull strategy.

23. The media recited in claim 22,
   wherein for each one of the consumer-producer pairs, the push strategy or the pull strategy is selected by further satisfying a latency service level agreement; and
   the one or more processors are further operable when executing the instructions to: if the latency service level agreement is not satisfied, then:
      select one or more of the consumer-producer pairs that have the pull strategy; and
      shift the selected consumer-producer pairs to the push strategy.

24. The media recited in claim 17, wherein the one or more processors are further operable when executing the instructions to:
   for a first one of the content consumers, access a content-consuming pattern with respect to a time period; and
   for a first one of the consumer-producer pairs, wherein the first consumer-producer pair comprises the first content consumer and one of the content producers, select between the push strategy and the pull strategy for delivering one or more items of content from the content producer to the first content consumer further based on the content-consuming pattern of the first content consumer and a time at which the items of content are delivered.

* * * * *